United States Patent [19]

Baker et al.

[11] Patent Number: 4,867,634
[45] Date of Patent: Sep. 19, 1989

[54] TURBOCHARGER TURBINE HOUSING PARTICULATE DEBRIS TRAP

[75] Inventors: Donald E. Baker, Westminister; Joe L. Byrne, Torrance; Leo R. Muller, Hawthorne; Phillip L. Schmidt, Compton, all of Calif.

[73] Assignee: Allied-Signal Inc., Morristown, N.J.

[21] Appl. No.: 171,627

[22] Filed: Mar. 22, 1988

Related U.S. Application Data

[63] Continuation of Ser. No. 861,697, May 9, 1986, abandoned.

[51] Int. Cl.⁴ .................. F02B 39/00; F01D 25/00
[52] U.S. Cl. .................. 415/121.2; 415/168.1; 60/614; 55/406
[58] Field of Search ............ 415/121 A, 168, 169, 415/205; 60/39.092, 602, 605, 611, 614; 55/306, 406

[56] References Cited

U.S. PATENT DOCUMENTS

| | | | |
|---|---|---|---|
| 911,802 | 2/1909 | Baldwin | 261/90 |
| 2,289,474 | 7/1942 | Anderson | 55/393 |
| 2,373,969 | 4/1945 | Lincoln | 55/406 X |
| 2,802,618 | 8/1957 | Prachar | 55/306 |
| 3,066,912 | 12/1962 | Scheper, Jr. | 415/121 A |
| 3,274,757 | 9/1966 | Wapler | 415/168 X |
| 3,309,867 | 3/1967 | Ehrich | 60/39.092 |
| 3,356,340 | 12/1967 | Bobo | 415/115 |
| 3,362,155 | 1/1968 | Driscoll | 60/39.092 |
| 3,380,711 | 4/1968 | Blattner et al. | 415/168 X |
| 3,465,950 | 9/1969 | Fried et al. | 55/306 |
| 3,521,431 | 7/1970 | Connors et al. | 55/306 |
| 3,733,814 | 5/1973 | Hull, Jr. et al. | 60/39.092 |
| 3,766,719 | 10/1973 | McAnally, III | 55/306 |
| 3,832,086 | 8/1974 | Hull, Jr. et al. | 415/121 G |
| 3,971,218 | 7/1976 | Toth, Jr. et al. | 60/602 X |
| 3,993,463 | 11/1976 | Barr | 55/306 |
| 4,076,508 | 2/1978 | Christensen | 55/309 |
| 4,406,126 | 9/1983 | Yokokura et al. | 60/605 R |
| 4,424,003 | 1/1984 | Brobeck | 415/214 X |
| 4,527,387 | 7/1985 | Lastrina et al. | 60/39.092 |
| 4,530,640 | 7/1985 | MacInnes | 415/205 X |

FOREIGN PATENT DOCUMENTS

2033353 9/1971 Fed. Rep. of Germany ...... 415/168

Primary Examiner—Robert E. Garrett
Assistant Examiner—Joseph M. Pitko
Attorney, Agent, or Firm—Ken C. Decker; William N. Antonis

[57] ABSTRACT

A turbocharger turbine housing particulate debris trap for collecting all unwanted exhaust gas entrained particles before engagement with the turbine wheel. The trap can be located anywhere in the exhaust system upstream of the turbine wheel and is designed to take advantage of both inertial and gravitational forces. Systems for purging the trap of collected debris is also disclosed.

22 Claims, 3 Drawing Sheets

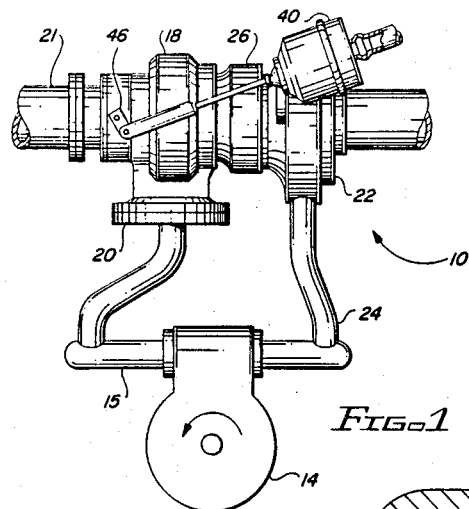
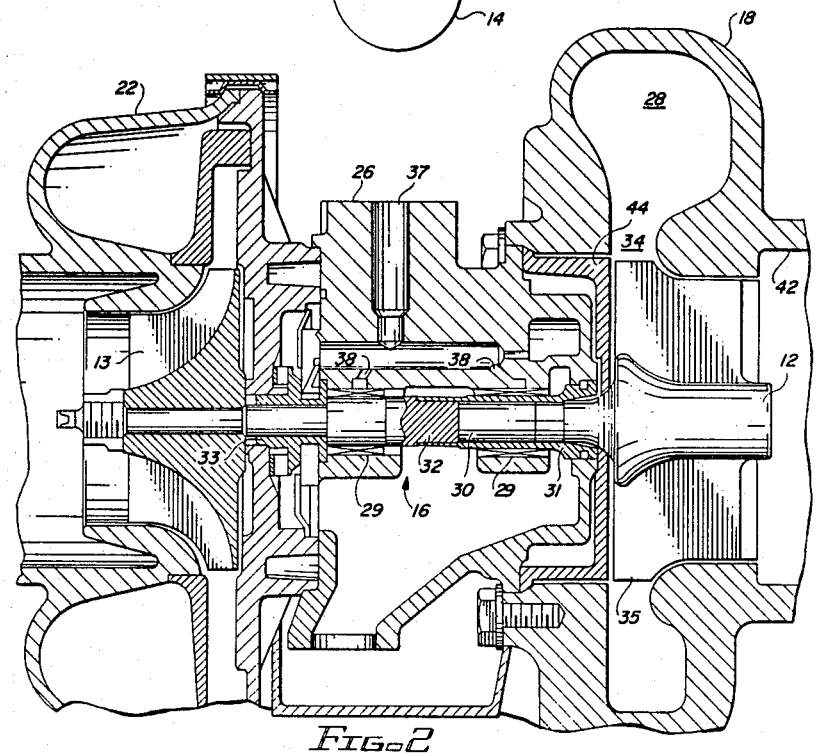

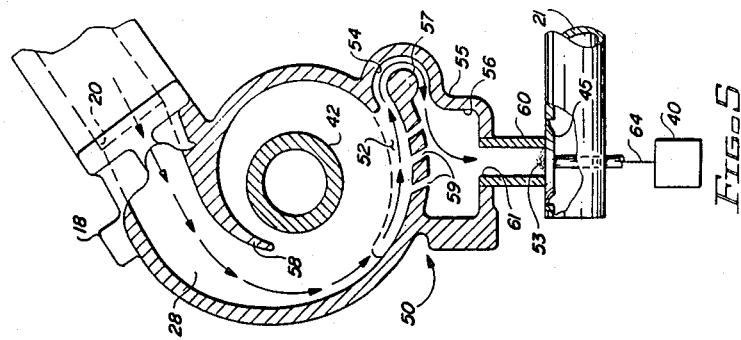
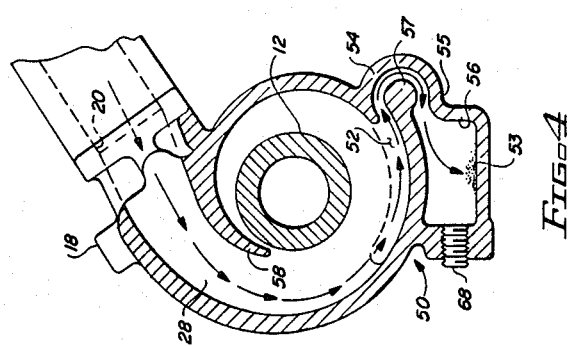
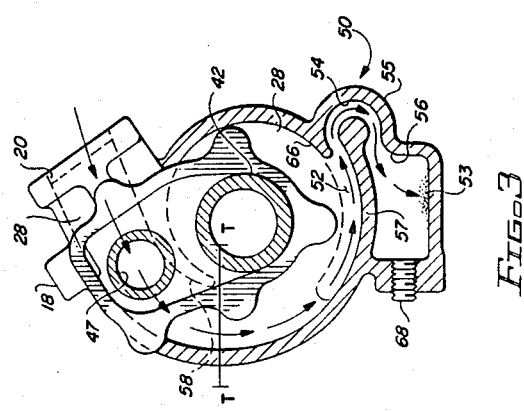

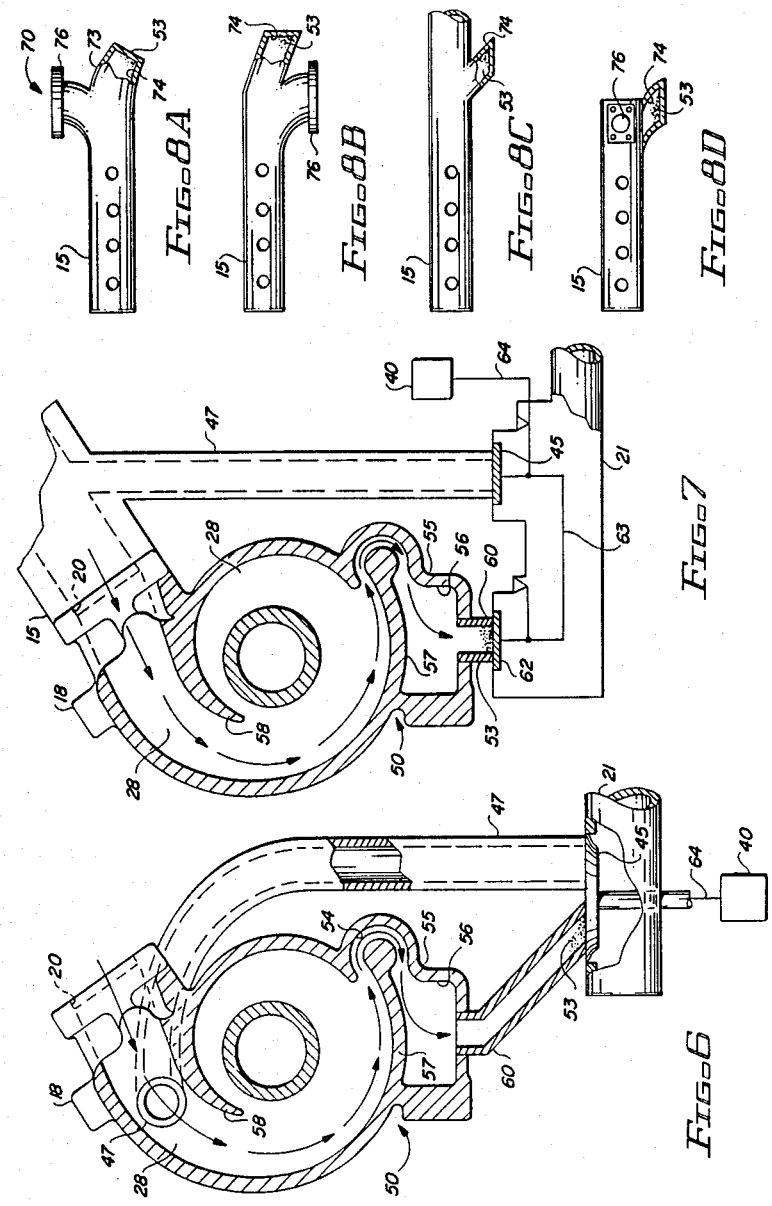

TURBOCHARGER TURBINE HOUSING PARTICULATE DEBRIS TRAP

This is a continuation of application Ser. No. 861,697; filed May 9, 1986, now abandoned.

BACKGROUND OF THE INVENTION

This invention relates to foreign particle separation and more particularly to particle separation and collection in the inlet gas flow to a turbocharger turbine.

It is well known that foreign particle injection into the inlet of a gas turbine engine can cause serious damage to the engine and its components. A turbocharged internal combustion engine relies on the exhaust gas of the engine to drive the turbine which in turn drives a compressor impeller for compression of ambient air for delivery to the engine. Historically, the turbine wheel has been made of a steel alloy in order to withstand the high temperature environment of the turbine. The design and strength of the blading has been adequate to withstand damage caused by most particles exiting the engine.

In order to reduce "turbo-lag", the weight and therefore the moment of inertia of the turbine wheel, the turbine wheels have recently begun to be made of a ceramic material. Ceramics, while capable of withstanding high operating temperatures are brittle in comparison with the alloy steel turbine wheel counterparts. Therefore, any particle in the exhaust gas poses a potential threat to the integrity of the ceramic turbine wheel.

Engine debris may come from many sources and ceramic turbine wheel failures have been caused by weld splatter shed from fabricated exhaust manifolds, oxide scale shed from both cast and fabricated exhaust manifolds, shedding of material trapped in crevices of fabricated exhaust manifolds, particles shed from cast exhaust manifolds, stainless steel protective flute particulates shed from oxygen sensors located upstream of the turbocharger, tips shed from exhaust gas thermocouples, injector tips, fragments shed from exhaust system metal gaskets, throttle plate screws injected into the engine and engine piston and exhaust valve fragments. It is therefore desirable to provide a means for separating out such particles before the exhaust gas stream comes into contact with the ceramic turbine blades. In order to preserve the integrity of the ceramic turbine wheel the separator or trap chosen must be effective in removing all unwanted particles from the exhaust gas stream. This is critical in view of the fragile nature of ceramic turbine wheel blading.

In accordance with the present invention, a turbocharger turbine housing particulate debris trap comprises a turbine housing including an inlet and outlet and a volute therebetween. A tongue extends from a point near the inlet of the turbine and separates the inlet and the volute. The tongue extends circumferentially around the turbine wheel to a point in the vertical plane tangential to the turbine wheel. The volute includes a radial expansion starting approximately below the tongue and extending downstream therefrom for approximately 90° of the volute. The radial expansion of the volute leads into a passage separated from the volute by a second tongue. The passage leads into a reservoir which is separate from the volute and formed integral with the turbine housing.

Used in association with the debris trap is a system for purging the trap of collected debris. In one such system, a purge line is flow connected to the reservoir and leads to the exhaust conduit. An exhaust bypass conduit for bypassing exhaust gas around the turbine is flow connected upstream of the turbine wheel to the exhaust conduit near the inlet of the purge line. An exhaust gas wastegate valve, controlled by an actuator, opens and closes both purge line outlet and the bypass conduit, thereby expelling the collected debris from the reservoir.

Therefore, it is an objective of this invention to provide a turbocharger turbine housing particulate debris trap wherein the trap efficiency is very high for particulates large enough to cause damage to a ceramic turbine wheel.

It is another object of this invention to provide a particulate debris trap which relies on both certrifugal as well as gravitational forces to effectively trap all unwanted particulates.

It is another object of this invention to trap and collect engine debris before it impacts the turbine wheel of a turbocharger and causes damage thereto.

It is a further object of this invention to provide a system of purging the debris trap of collected foreign particles.

BRIEF DESCRIPTION OF THE DRAWINGS

FIG. 1 is a schematic diagram of a turbocharged internal combustion engine.

FIG. 2 is a cross-sectional view of a turbocharger employing the preferred embodiment of the turbine housing particulate debris trap of the present invention.

FIG. 3 is an end view of a passenger car wastegated turbine housing including the particulate debris trap of the present invention.

FIG. 4 is an end view of a commercial diesel non-waste gated turbine housing including the particulate debris trap of the present invention.

FIG. 5 is an end view of a waste gated turbine housing including the particulate debris trap and a system to purge the debris trap according to the present invention.

FIG. 6 is a cross-sectional view of an alternative design purge system.

FIG. 7 is a cross-sectional view of a third design of a purge system.

FIGS. 8a, 8b, 8c and 8d are a second type of particulate trap of the present invention.

DETAILED DESCRIPTION OF THE INVENTION

A turbocharged engine system is shown in FIGS. 1 and 2 and includes turbomachinery in the form of a turbocharger 10 generally comprising a turbine wheel 12 and a compressor impeller 13 mounted on opposite ends of a common shaft 16. The turbine wheel 12 is disposed within a turbine housing 18 which includes an inlet 20 for receiving exhaust gas from an engine 14 via suitable piping 15 and an outlet 21 for discharging the exhaust gas. The turbine housing 18 guides the engine exhaust gas into communication with and expansion through the turbine wheel 12 for rotatably driving the turbine wheel. Driving of the turbine wheel 12 simultaneously and rotatably drives the compressor impeller 13 which is carried within a compressor housing 22. Compressor housing 22 and compressor impeller 13 cooperate to draw in and compress ambient air for supply to the intake of the engine 14 through piping 24.

Turbine housing 18 and compressor housing 22 are mounted on either side of a center housing 26. Center housing 26 includes floating journal bearings 29 for rotatably receiving and supporting the shaft 16. A thrust bearing assembly 33 is carried about the shaft adjacent the compressor housing for preventing axial excursions of the shaft 16. A heat shield 44 is positioned about the shaft at the turbine end thereof in order to insulate the center housing 26 from the harmful effects of the exhaust gas.

Lubrication such as engine oil or the like is supplied via the center housing 26 to the journal bearings 29 and to the thrust bearing assembly 33. A lubricant inlet port 37 is formed in the center housing 26 and is adapted for connection to a suitable source of lubricant such as filtered engine oil. The port communicates with a network of internal supply passages 38 which are formed in the center housing 26 to direct the lubricant to the appropriate bearings 29 and 33. The lubricant circulated to the bearings is collected in a suitable sump or drain for passage to appropriate filtering, cooling and recirculation equipment, all in a well-known manner.

In many turbocharged engines, it is possible for the turbocharger 10 to operate at rotational speeds higher than the turbocharger mechanical components can withstand, or to supply compressed charge air to the engine at boost pressures higher than the engine can withstand. Specifically, at relatively high operating speeds or loads, the mass flow rate of exhaust gases is sufficient to drive the turbine 12 at a rotational speed exceeding turbocharger or engine critical design limits. To prevent damage to the system, limiting means are provided for preventing the rotational speed of the turbine and the compressor from exceeding a predetermined level, and thereby limit the compressor boost pressure. As shown in FIG. 1, one such limiting means comprises a actuator 40 mounted on the turbine 18, and including a pivot pin extending outwardly from the turbine 18 and connected to a crank arm 46. Movement of the crank arm 46 serves to move an internally mounted valve (shown in FIGS. 5, 6 and 7), such as a butterfly or flapper or poppet valve, to open and close a turbine bypass passage. More specifically, the valve is disposed along an internal passage communicating between the exhaust manifold 15 and the exhaust conduits 21 so that a portion of the exhaust gases bypass the turbine when the valve is open consequently to limit turbocharger rotational speed and boost. Importantly, the specific construction of wastegate systems are generally well known in the art, and thereby are not shown or described in substantial detail. However, for a specific example of a representative turbocharger including the actuator, crank arm, valve assembly, and bypass passage, see U.S. Pat. Nos. 4,075,849 and 4,120,156.

As explained above, the trend in turbomachinery design is the replacement of a nickel alloy turbine wheel with a suitable ceramic turbine wheel 12. The ceramic-to-metal joint between the ceramic turbine wheel 12 and the metal shaft 16 is not envisioned to be part of this application. However, generally the ceramic turbine wheel 12 includes a stub shaft 30 which is press fit, brazed or otherwise secured to a cylindrical sleeve 31. Attached within the other end of the sleeve is the metal shaft 32, which once assembled, comprise shaft 16. Because of the brittle nature of ceramics, the present invention is particularly suited for use in turbochargers employing a ceramic turbine wheel. Additionally, the present invention could be used in conjunction with an exhaust gas particulate traps.

As shown in FIGS. 2-7, the turbine housing 18 forms a generally scroll-shaped volute 28 which accepts the exhaust gas from the engine 14 and directs it through an annular passage 34 onto the turbine wheel blades 35. Thereafter, the exhaust gas flows axially through the turbine shroud 42 and exits the turbocharger 10 through outlet 21 either into a suitable pollution-control device or the atmosphere.

The exhaust gas may include exhaust gas entrained particulates which can cause blade or ceramic wheel failure. A particulate debris trap 50 having several distinct features is formed as part of the turbine housing 18 to trap and collect all undesirable particulates.

Shown in FIG. 3 is the particulate debris trap of the present invention as used in association with a wastegated turbine housing. The particulate debris trap includes a radial expansion of the volute at 52 which extends over approximately a 90° arc in the turbine housing volute 28. The volute expansion 52 channels debris 53 into a passage 54 and thereafter into a reservoir 55 defining a chamber 56 external to the turbine volute 28. A wall 57 divides the chamber 56 from the radial expansion 52. A threaded bore 65 is formed in the wall of the reservoir and a removable plug 68 may be used to periodically clean the trap as necessary.

It is important to note that the trap 50 is both an "inertia" and "gravitational" type trap. When used without regard to orientation considerations, the exhaust gas entrained debris is centrifuged to the outer portion of the volute 28, carried into the radial volute expansion 52 and thereafter through passage 54 and finally into the chamber 56. However, while it was found that inertial trapping of particles was extremely successful during periods of high turbocharger turbine wheel speeds (190K RPM), the trap did not successfully trap particles larger than 0.031 inches in diameter and 2.2 mg. in weight at 30K RPM and larger than 0.078 inches in diameter and 34.4 mg. in weight at 100K RPM. Thus, the inertial trapping of particles relates to the velocity and weight of the particles; the greater the velocity, the heavier the particle centrifuged to the radial outer zones of volute 28.

Therefore, in order to trap all potentially damaging particulates, "gravitational" considerations were designed into the system to compliment the "inertial" features discussed above, when exhaust gas velocity does not impart the requisite momentum to a particle necessary to centrifuge it to the radial outer zones of the volute. In its installed conditions, the tongue of the turbocharger is in the vertical plane which is tangential to the turbine wheel. Furthermore, the radial expansion in the turbine housing volute lies within the same vertical plane as the end of the tongue. Since the radial expansion extends for approximately 90° about the volute and the reservoir is at the downstream end of said radial expansion, the vertical plane intersects the radial expansion upstream of the reservoir. The gravitational principle requires that the volute entrance section T—T (FIGS. 3) of the turbocharger turbine be extended to a point about the circumference of the turbine wheel, wherein any particles having zero velocity fall off the end of the tongue and do not strike the turbine wheel blading. In order to accomplish this, tongue 58 which separates the turbine housing inlet passage 20 from volute 28, is extended circumferentially around the turbine wheel generally to the vertical plane which is tangential to the turbine wheel 12, shown in FIG. 4. This installation orientation prevents particle damage to the turbine wheel under low speed conditions when the particles have insufficient momentum to carry them to the outer edge of the volute and thereafter into the trap. Thus, this trap design and orientation ensure that exhaust gas entrained debris is prevented from dropping into the turbine wheel by the tongue 58 under low speed conditions, as well as ensure that all particles are centrifuged to the outer edge of the volute 28 and into the trap 50 during high speed operation. Particles which enter radial expansion 52 are carried into passage 54 and thereafter into reservoir 55. A second tongue 66 separates the radial expansion 52 and the volute 28.

FIG. 4 discloses the particulate debris trap of the present invention as used in a non-waste gated commercial diesel application. The turbine housing is the same as that shown in FIG. 3 except that bypass passage 47 is lacking. Due to the engine air flow design features of a commercial diesel engine there is no overboosting, therefore a waste gate is not necessary.

As shown in FIG. 4, the direction of gravity is designated by arrow A. This clearly shows that any particle is prevented from striking the turbine wheel blading by tongue 58. Additionally, arrow A shows that wall 57 may present a slightly uphill barrier to any particle trying to enter passage 54. However, since volute expansion 52 is radially outward from the turbine wheel, the particles could temporarily rest atop the wall 57 until the exhaust gas speed is increased enough to carry the particles into passage 54.

FIGS. 5-7 disclose an additional feature which can be used in association with the debris trap as shown above. These drawings disclose alternative embodiments of a system of purging the collected debris. Shown in FIG. 5 is the turbine housing of the present invention in combination with a waste gate and a system for purging the trap of collected debris 53. Per normal operation debris is directed through passage 54 into the reservoir 55 for collection. Attached to the reservoir 55 is a purge line 60 which is flow connected to exhaust conduit 21. Waste gate valve 45 (shown as a poppet valve) is positioned so that the valve head closes the opening 61 between the purge conduit 60 and the bypass conduit 21. Collected debris 53 collects atop the valve head. When overboosting of the engine occurs, actuator 40 (shown in FIG. 1) connected to wastegate valve 45 via rod 64, operates to open and close the passage between the purge and exhaust conduits, 60 and 21 respectively. In this manner, collected debris 53 is purged from the trap whenever the waste gate 45 is open. Associated with this system of purging is the need to increase the amount of bypass exhaust gas flow. In particular, passage 54 is not large enough to handle the necessary exhaust gas bypass flow. In order to increase this bypass flow, at least one bypass wall passage 59 is formed in wall 57 between the volute 28 and the reservoir 56. Thus, when waste gate 45 is opened, exhaust gas from volute 28 flows through bypass wall passages 59 as well as passage 54 into chamber 56 and out the exhaust conduit 21. Alternatively, purge line 60 can be eliminated and the waste gate 45 can serve to close the trap opening 61 directly into the bypass conduit 21.

In FIGS. 6 and 7, an exhaust gas bypass conduit 47 is connected to the engine exhaust manifold 15 upstream of the turbine wheel 12, and a debris purge line 60 is attached to the bottom of the reservoir 55. In this manner the bypassed exhaust gas never imparts any energy to the turbine wheel 12.

In FIG. 6, the exhaust gas bypass conduit 47 is connected to the turbine housing 18 and the debris purge line 60 is attached to the bottom of reservoir 55.

Purge line 60 and the exhaust gas bypass line 47 are flow connected to exhaust conduit 21 in relative close relationship to one another. Debris 53 collected by the debris trap will congregate against the wastegate valve 45. However, in this embodiment, the wastegate valve 45 is sized so that it covers both the purge line 60 and the exhaust gas bypass line 47. Again, per normal operation, opening of the wastegate valve 45 also opens the purge line and any collected debris 53 is expelled from the vehicle's exhaust system.

FIG. 7 discloses an alternative means for purging the system of collected debris during operation of the wastegate valve. Shown is the purge line 60 and the exhaust gas bypass line 47 connected to the vehicle exhaust conduit 21. The wastegate valve 45 is sized to block the flow through the exhaust gas bypass line when closed. A second valve 62 is used to hold the collected debris 53 within the reservoir 56. Wastegate valve 45 and valve 62 are connected to each other through a linkage system 63 which is in turn connected to the actuator 40. When the actuator 40 opens waste gate valve 45 to prevent overboosting of the engine, valve 62 also opens to allow the collected debris to be swept from the system.

FIGS. 8(a)-(d) are cross-sectional views of a second type of exhaust gas particulate debris trap which can be formed in the exhaust piping 15 downstream of the engine 14. This second type of trap 70 can be used either independently of the turbine housing particulate debris trap 50 shown in FIGS. 3-7 or in cooperation therewith. In each embodiment, the piping 15 leading from the engine 14 is formed with a generally Y-shaped junction. One of the forks 73 leads to a catch volume 74 and the second fork to the turbocharger 10. A flange 76 is formed as part of piping 15 to provide for attachment of the turbocharger 10.

Specifically, FIG. 8(a) discloses a trap wherein the turbocharger 10 is mounted atop the pipe 15; FIG. 8(b) is a bottom mount configuration; FIG. 8(c) is an end mount configuration wherein the turbocharger could be mounted in any orientation, and FIG. 8(d) is a side mount configuration.

During engine operation, exhaust gas from the engine possesses a certain velocity and any particle entrained in the gas will have a certain momentum. In the case of FIGS. 5(a), (c) and (d), the particles having a relatively low momentum will be carried into the catch volume 74 without ever entering the turbine housing 18. As shown in detail above, the catch volume 74 can be purged by any of the systems described herein.

While a number of specific embodiments of this invention have been illustrated and described, it is to be understood that these are provided by way of example only and that the invention is not to be construed as being limited thereto.

We claim:

1. In a turbocharger turbine housing defining an inlet and outlet and having a volute therebetween, a particulate debris trap comprising:

means for directing exhaust gas entrained particles having relatively low momentum into a radial expansion of the volute;

means for directing exhaust gas entrained particles having relatively high momentum into said radial expansion;

means for directing said low and high momentum particles from said radial expansion of the volute to a point outside of the turbine housing volute;

means for collecting said particles;

an exhaust gas bypass conduit upstream of said turbine volute;

a purge line flow connected to the means for collecting said particles; and means for simultaneously opening and closing said exhaust gas bypass conduit and said purge line.

2. The particulate debris trap according to claim 1 wherein said means for simultaneously opening and closing said exhaust gas bypass conduit and said purge line comprises:

a wastegate valve sized to cover said purge line and said exhaust bypass conduit; and actuator means for moving said wastegate valve to open and close said purge line and said exhaust bypass conduit.

3. The particulate debris trap according to claim 1 wherein said means for simultaneously opening and closing said exhaust gas bypass conduit and said purge line comprises:

a wastegate valve sized to close said exhaust bypass conduit;

a second valve sized to close said purge line;

linkage means for interconnecting said wastegate valve and said second valve; and actuator means for moving said valves to open or close said purge line and bypass conduit.

4. In a turbocharger turbine housing defining an inlet and outlet and having a volute therebetween, a particulate debris trap comprising:

means for directing exhaust gas entrained particles having relatively low momentum into a radial expansion of the volute;

means for directing exhaust gas entrained particles having relatively high momentum into said radial expansion;

means for directing said low and high momentum particles from said radial expansion of the volute to a point outside of the turbine housing volute;

means for collecting said particles;

a purge line flow connected to said means for collecting;

a wastegate valve sized to cover said purge line; and actuator means for moving said wastegate valve to open or close the purge line; and at least one wall bypass passage between said volute and said means for collecting.

5. A turbocharger comprising:

a turbine wheel rotatably driven by exhaust gases from an internal combustion engine;

a compressor impeller mounted on a shaft common with said turbine wheel and rotatably driven thereby;

a center housing including bearing means to rotatably support the shaft;

a compressor housing attached to said center housing and disposed around said compressor impeller to direct ambient air through the impeller whereby said air is compressed for supply to the internal combustion engine;

a turbine housing attached to said center housing and disposed around said turbine wheel for directing exhaust gases from said internal combustion engine through said turbine wheel, said turbine housing defining an inlet and an outlet and a volute therebetween;

a tongue positioned between said turbine housing inlet and said volute;

a radial expansion of said volute; and a particulate debris reservoir;

said tongue, when said turbocharger is installed, extends to a vertical plane which is tangential to said turbine wheel, which vertical plane intersects the radial expansion upstream of said reservoir.

6. The turbocharger of claim 5 wherein the turbine wheel is ceramic.

7. The turbocharger of claim 6 wherein said radial expansion extends less than 90° about the turbine wheel.

8. The turbocharger according to claim 6 wherein said turbine housing defines a bypass passage such that exhaust gas in said inlet can bypass said turbine wheel to said turbine housing outlet.

9. The turbocharger of claim 5 further comprising means for purging said reservoir of collected particulate debris.

10. The turbocharger according to claim 9 wherein said means for purging comprises:

a purge line flow connected to said means for collecting;

means for opening and closing said purge line; and at least one wall bypass passage between said radial expansion and said means for collecting.

11. A turbocharger comprising:

a turbine wheel rotatably driven by exhaust gases from an internal combustion engine;

a compressor impeller mounted on a shaft common with said turbine wheel and rotatably driven thereby;

a center housing including bearing means to rotatably support the shaft;

a compressor housing attached to said center housing and disposed around said compressor impeller to direct ambient air through the impeller whereby said air is compresesd for supply to the internal combustion engine;

a turbine housing attached to said center housing and disposed around said turbine wheel for directing exhaust gases from said internal combustion engine through said turbine wheel, said turbine housing defining an inlet and an outlet and a volute therebetween;

a tongue positioned between said turbine housing inlet and said volute;

a radial expansion of said volute;

a particulate debris reservoir; and a wall defining a passage therein dividing said radial expansion from said reservoir, said passage located at the downstream end of said radial expansion;

a bore through said wall into said reservoir; and a removable plug therein.

12. A turbocharger comprising:

a turbine wheel rotatably driven by exhaust gases from an internal combustion engine;

a compressor impeller mounted on a shaft common with said turbine wheel and rotatably driven thereby;

a center housing including bearing means to rotatably support the shaft;

a compressor housing attached to said center housing and disposed around said compressor impeller to direct ambient air through the impeller whereby said air is compressed for supply to the internal combustion engine;

a turbine housing attached to said center housing and disposed around said turbine wheel for directing exhaust gases from said internal combustion engine through said turbine wheel, said turbine housing defining an inlet and an outlet and a volute therebetween;

a tongue positioned between said turbine housing inlet and said volute;

a radial expansion of said volute;

a particulate debris reservoir; and a wall defining a passage therein dividing said radial expansion from said reservoir, said passage located at the downstream end of said radial expansion;

an exhaust gas bypass conduit upstream of said turbine wheel;

a purge line flow connected to said reservoir and means for simultaneously opening and closing said exhaust gas bypass conduit and said purge line.

13. The turbocharger according to claim 12 wherein said means for simultaneously opening and closing comprises:
a wastegate valve sized to cover said exhaust bypass line and purge line; and
an actuator means for moving said wastegate valve to open and close said purge line and exhaust bypass conduit.

14. The turbocharger according to claim 12 wherein said means for simultaneously opening and closing comprises:
a wastegate valve sized to close said exhaust bypass conduit;
a second valve sized to close said purge line;
linkage means for interconnecting said wastegate valve and said second valve; and
actuator means for simultaneously moving said valves to open and close said purge line and bypass line.

15. A turbocharger comprising:
a turbine wheel rotatably driven by exhaust gases from an internal combustion engine;
a compressor impeller mounted on a shaft common with said turbine wheel and rotatably driven thereby;
a center housing including bearing means to rotatably support the shaft;
a compressor housing attached to said center housing and disposed around said compressor impeller to direct ambient air through the impeller whereby said air is compressed for supply to the internal combustion engine;
a turbine housing attached to said center housing and disposed around said turbine wheel for directing exhaust gases from said internal combustion engine through said turbine wheel, said turbine housing defining and inlet and an outlet and a volute therebetween;
a radial expansion of said volute;
a particulate debris reservoir;

a wall defining a passage therein dividing said radial expansion from said reservoir, said passage located at the downstream end of said radial expansion;
a purge line flow connected to said means for collecting;
a wastegate valve sized to cover said purge line;
actuator means for moving said wastegate valve into a closed or opened position with respect to the purge line; and
at least one wall bypass passage between said radial expansion and said means for collecting.

16. In a turbocharger turbine housing defining an inlet and outlet and having a volute therebetween, a particulate debris trap comprising:
a radial expansion of said volute;
a tongue extending from said turbine housing inlet to a point at the periphery of a turbine wheel and with said housing; said point being above said radial expansion and both said point and said radial expansion being in a vertical plane when said turbocharger is installed for use;
means for directing exhaust gas entrained particles having relatively high momentum into said radial expansion;
means for directing said low and high momentum particles from said radial expansion of the volute to a point outside of the turbine housing volute; and
means for collecting said particles.

17. The particulate debris trap according to claim 16 further including means for purging said means for collecting.

18. The particulate debris trap according to claim 17 wherein said means for purging comprises a removable plug in said means for collecting.

19. The particulate debris trap according to claim 17 wherein said means for purging comprises:
a purge line flow connected to said means for collecting;
means for opening and closing said purge line; and
at least one wall bypass passage between said volute and said means for collecting.

20. The particulate debris trap of claim 16 wherein said means for directing said low and high momentum particles from said radial expansion is downstream of said vertical plane.

21. A turbocharger turbine housing particulate debris trap comprising:
a turbine housing having an inlet and an outlet and a volute therebetween;
a tongue member extending from said inlet to a vertical plane which is tangential to a turbine housing; and .
means for collecting debris entrained in exhaust gas of an engine, said means for collecting located in said vertical plane, said means for collecting including a reservoir flow connected to said volute.

22. The turbocharger turbine housing particulate debris trap according to claim 21 wherein said means for collecting further comprises:
a radial expansion of said volute, said vertical plane intersecting the upstream end of said radial expansion; and
a passage at the downstream end of said radial expansion.

* * * * *